United States Patent
Vadera

(10) Patent No.: US 11,388,087 B2
(45) Date of Patent: Jul. 12, 2022

(54) LABEL SWITCHED PATH (LSP) PROTECTION ACROSS MULTIPLE DOMAINS OF A SEGMENT ROUTING (SR) NETWORK

(71) Applicant: Ciena Corporation, Hanover, MD (US)

(72) Inventor: Atul Vadera, Gurugram (IN)

(73) Assignee: Ciena Corporation, Hanover, MD (US)

( * ) Notice: Subject to any disclaimer, the term of this patent is extended or adjusted under 35 U.S.C. 154(b) by 181 days.

(21) Appl. No.: 16/690,226

(22) Filed: Nov. 21, 2019

(65) Prior Publication Data

US 2021/0111991 A1 Apr. 15, 2021

(30) Foreign Application Priority Data

Oct. 9, 2019 (IN) .............................. 201911040836

(51) Int. Cl.
*H04L 45/00* (2022.01)
*H04L 45/28* (2022.01)
*H04L 45/50* (2022.01)

(52) U.S. Cl.
CPC .............. *H04L 45/22* (2013.01); *H04L 45/28* (2013.01); *H04L 45/50* (2013.01)

(58) Field of Classification Search
CPC ......... H04L 45/22; H04L 45/28; H04L 45/50; H04L 45/04
See application file for complete search history.

(56) References Cited

U.S. PATENT DOCUMENTS

| | | | |
|---|---|---|---|
| 2015/0103844 A1* | 4/2015 | Zhao ..................... | H04L 45/028 |
| | | | 370/410 |
| 2016/0277290 A1* | 9/2016 | Sivabalan ............... | H04L 45/50 |
| 2017/0064717 A1* | 3/2017 | Filsfils .................... | H04L 47/17 |
| 2020/0304402 A1* | 9/2020 | Kondreddy ........... | H04L 45/128 |
| 2020/0351188 A1* | 11/2020 | Arora ..................... | H04L 43/10 |
| 2021/0051092 A1* | 2/2021 | Retana .................... | H04L 45/22 |
| 2021/0176168 A1* | 6/2021 | Eckert ................... | H04L 45/302 |

* cited by examiner

*Primary Examiner* — Donald L Mills
(74) *Attorney, Agent, or Firm* — Clements Bernard Baratta; Lawrence A. Baratta, Jr.; Christopher L. Bernard

(57) ABSTRACT

Systems and methods for establishing path protection modes are provided. In one embodiment, a processor is configured to create a traffic policy that defines a Label Switched Path (LSP) configured to route data traffic in a unitary direction in a data plane of a telecommunications network. The LSP is configured to route the data traffic from a source router of an initial network domain to a destination router of a final network domain. The processor also creates a protection policy that defines one or more backup protection paths for routing the data traffic around one or more faulty nodes or links in a Segment Routing (SR) architecture of the telecommunications network. Furthermore, the processor distributes the traffic policy and protection policy in the telecommunication network via the Path Computation Element Protocol (PCEP).

20 Claims, 5 Drawing Sheets

LABEL SWITCHED PATH (LSP) PROTECTION ACROSS MULTIPLE DOMAINS OF A SEGMENT ROUTING (SR) NETWORK

FIELD OF THE DISCLOSURE

The present disclosure generally relates to networking systems and methods. More particularly, the present disclosure relates to Segment Routing (SR) networks and policies for routing data traffic along Label Switched Path (LSP) routes or alternatively along LSP protection paths where the end-to-end LSP extends across multiple domains.

BACKGROUND OF THE DISCLOSURE

Data may be routed over multiple types of networks, such as access networks and aggregate networks. In some cases, data may be routed using a Segment Routing (SR) strategy where a source node or source router preplans a desired path. Alternate paths, or protection paths, may also be established for enabling the routing of data traffic when there is a defect or blockage at a node or along a link between adjacent nodes of the desired path.

Among other things, the RFC 5450 protocol defines a Label Switched Path Association (LSPA) object and an associated protection mode. The protection mode can be supported by including the LSPA object in a Label Switched Path (LSP) request. The flag field of the LSPA object has an "L" flag which can be set to signify that local protection is desired. For example, in this case, the local protection may include Topology Independent-Loop Free Alternate (TI-LFA). When the L flag is not set (i.e., zero), the unset flag signifies that local protection is not desired. Since SR assigns multiple Segment Identifiers (SIDs) to an interface or link between nodes, adjacency SIDs with TI-LFA protection can be used in the former case to define the LSP. Also, adjacency SIDs without TI-LFA protection can be used in the latter case to define the LSP.

With L=0 or L=1 in the LSPA object, the above protection mode can be supported. Another type of LSP protection mode can be supported by establishing two disjoint LSPs from one router (or node) at one network to another router (or node) at another network and associating the LSPs using Path Protection Association Group (PPAG) at the first router. Although a combination of TI-LFA (e.g., if the L flag of the LSPA object is set to one) and other path protection can be supported, the type of protection used may be dependent on the local policy of each controller at the router.

The current constructs (e.g., objects and their fields) available in Path Computation Element Protocol (PCEP) are not enough to clearly define an end-to-end "Protection Policy" for all possible protection modes, particularly when the path spans across multiple domains. There are no procedures in conventional networking systems where a controller (e.g., a master controller at a headend of the network) can request the desired behavior for the various LSP protection modes for an LSP spanning across multiple domains. Even if the L flag is set, the headend controller cannot determine whether TI-LFA or some other path protection strategy will be active on the intermediate routers interfacing adjacent networks. Therefore, the conventional systems may create an ambiguity regarding various types of protection modes. If the L flag is unset, an intermediate controller can interpret it as not requiring any protection, although other types of path protection might be available at the intermediate routers or nodes. This may create an ambiguity for other types of protection modes. If a local policy is established for providing path protection even if the L flag of the LSPA object is unset, another ambiguity may be created for other types of protection modes.

Therefore, there is need in the field of SR and LSP protection to provide flexibility in the control of path protection modes. Thus, the following explanation includes multiple possibilities in which an end-to-end LSP can be established.

BRIEF SUMMARY OF THE DISCLOSURE

The present disclosure describes systems, methods, and non-transitory computer-readable media for establishing an end-to-end LSP path protection mode, for an LSP spanning selected from various protection paths in a Segment Routing (SR) architecture. In one embodiment, a non-transitory computer-readable medium is configured for storing software logic executable by one or more processing devices. The software logic enables the one or more processing devices to create a traffic policy that defines a Label Switched Path (LSP) configured to route data traffic in a unitary direction in a data plane of a telecommunications network, the LSP configured to route the data traffic from a source router of an initial network domain to a destination router of a final network domain. The software logic also enables the one or more processing devices to create a protection policy that defines one or more backup protection paths for routing the data traffic around one or more faulty nodes or links in a Segment Routing (SR) architecture of the telecommunications network. Also, the software logic enables the one or more processing devices to distribute the traffic policy and protection policy in the telecommunications network via the Path Computation Element Protocol (PCEP).

In another embodiment of the present disclosure, a controller comprises a processing device and a memory device configured to store instructions that, when executed, cause the processing device to perform certain functions. The processing device creates a traffic policy that defines a Label Switched Path (LSP) configured to route data traffic in a unitary direction in a data plane of a telecommunications network. The LSP is configured to route the data traffic from a source router of an initial network domain to a destination router of a final network domain. The processing device further creates a protection policy that defines one or more backup protection paths for routing the data traffic around one or more faulty nodes or links in a Segment Routing (SR) architecture of the telecommunications network. Also, the processing device distributes the traffic policy and protection policy in the telecommunications network via the Path Computation Element Protocol (PCEP).

In still another embodiment of the present disclosure, a method may include the step of creating a traffic policy that defines a Label Switched Path (LSP) configured to route data traffic in a unitary direction in a data plane of a telecommunications network, whereby the LSP is configured to route the data traffic from a source router of an initial network domain to a destination router of a final network domain. The method may also include the step of creating a protection policy that defines one or more backup protection paths for routing the data traffic around one or more faulty nodes or links in a Segment Routing (SR) architecture of the telecommunications network. Also, the method may include distributing the traffic policy and protection policy in the telecommunication network via the Path Computation Element Protocol (PCEP). In some embodiments, the traffic policy and protection policy may be distributed to a plurality of routers including at least the source router and destination router, and at least one of the backup protection paths may include a Topology Independent-Loop Free Alternate (TI-LFA) procedure.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to systems and methods for establishing primary routing paths and further establishing protection paths for routing data when the primary routing paths are blocked or defective. Also, the present disclosure allows one or more controllers operating in the control plane to control the data routing actions of nodes (e.g., routers) to follow the primary routing paths or alternate protection paths (if needed). The one or more controllers may be configured to select various types of protection policies over an end-to-end Label Switched Path (LSP), even for an end-to-end LSP that spans across multiple domains of a telecommunications network.

The protection policies may include Segment Routing (SR) for re-routing around certain segments of a data path. Specifically, SR is a type of source routing, where a source node chooses a path and encodes it in a packet header as an ordered list of segments. Each segment can be identified by a Segment Identifier (SID), which may include instructions for routing over a best available path, routing through a sequence of nodes using the best available paths, following specific links, applying certain services, etc.

With Segment Routing (SR), the telecommunications network does not need to maintain a per-application or per-flow state. Instead, by incorporating the routing instructions in the header of a packet, the nodes along the path can follow forwarding instructions provided in the packet. SR can be applied to the Multiprotocol Label Switching (MPLS) architecture with no change in the forwarding plane and can utilize network bandwidth more effectively than traditional MPLS networks.

Figure 1:
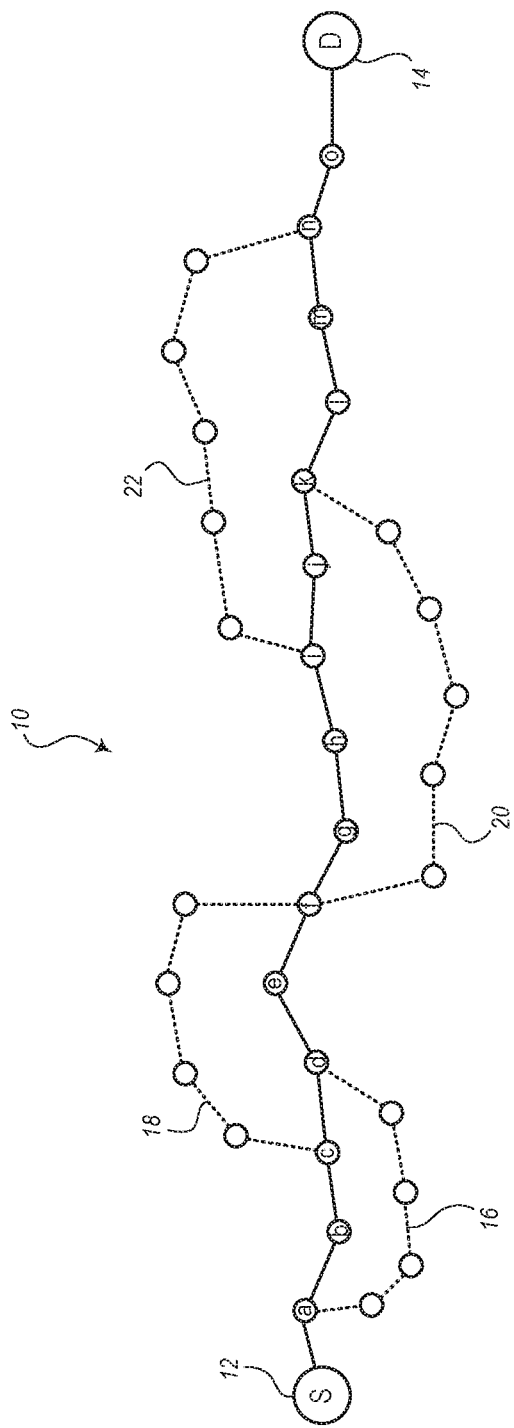
FIG. 1 is a diagram illustrating a Label Switched Path (LSP) of a telecommunications network in which Segment Routing (SR) is provided for designating a primary path and multiple backup protection paths, according to various embodiments of the present disclosure.

FIG. 1 is a diagram showing an embodiment of a routing path 10 for routing data from a source node 12 to a destination node 14. The nodes 12, 14 may be routers, switches, or other suitable types of network or edge elements. The routing path 10 may be included in a telecommunications network and may more particularly be included within a single domain or an area of the network. The routing path 10 includes a primary path (shown as solid lines) which links a number of intermediate nodes between the source node 12 and the destination node 14. In the illustrated example, the primary path of the routing path 10 passes through intermediate nodes a, b, c, d, e, f, g, h, j, k, l, m, n, o.

If there is a defect at one or more of the nodes a, b, c, . . . , o or if there is a defect along the respective links between each pair of adjacent nodes, the routing path 10 may further include one or more alternate paths where the data traffic can be directed to re-route the data around the faulty node or link. For example, as shown in the embodiment of FIG. 1, the routing path 10 includes four alternate paths, also referred to as a protection path or backup path. As an example, at least some of the protection paths within a domain may be derived by a process including Topology Independent-Loop Free Alternate (TI-LFA).

A first backup protection path 16, including any number of additional nodes, can be used as an alternate path for the segment of the primary path including nodes a, b, c, and d. The first backup protection path 16 can be used if there is a defect on nodes b and/or c. Also, the first backup protection path 16 can be used if there is a defect on the links between the pairs of nodes including a and b; b and c; and/or c and d. For a link failure, a TI-LFA computed path may also be used to protect the link.

A second backup protection path 18, including any number of additional nodes, can be used as an alternate path for the segment of the primary path including nodes c, d, e, and f. The second backup protection path 18 can be used if there is a defect on nodes d and/or e. Also, the second backup protection path 18 (or a TI-LFA computed path) can be used if there is a defect on the links between the pairs of adjacent nodes including c and d; d and e; and/or e and f for protecting the link.

A third backup protection path 20, including any number of additional nodes, can be used as an alternate path for the segment of the primary path including nodes f, g, h, i, j, and k. The third backup protection path 20 can be used if there is a defect on nodes g, h, i, and/or j. Also, the third backup protection path 20 (or a TI-LFA path) can be used if there is a defect on the links between the pairs of adjacent nodes including f and g; g and h; h and i; i and j; and/or j and k.

A fourth backup protection path 22, including any number of additional nodes, can be used as an alternate path for the segment of the primary path including nodes i, j, k, l, m, and n. The fourth backup protection path 22 can be used if there is a defect on nodes j, k, 1, and/or m. Also, the fourth backup protection path 22 (or a TI-LFA path) can be used if there is a defect on the links between the pairs of adjacent nodes including i and j; j and k; k and l; l and m; and/or m and n.

In this example shown in FIG. 1, the first and second backup protection paths 16 and 18 are overlapping protection paths. Thus, if there is a defect on the link between intermediate nodes c and d, either one of the backup paths 16 and 18 can be used for re-routing around the defective link. Also, third and fourth backup protection paths 20 and 22 in this example are also overlapping protection paths. Thus, if there is a defect on node j or if there is a detect on the link between nodes i and j or between nodes j and k, either one of the backup paths 20 and 22 can be used for re-routing around the defective node or links.

The source node 12 can be referred to as an ingress label edge router and the destination node 14 can be referred to as an egress label edge router for routing data from a front edge of a domain (or area) to a back edge of the domain (or area). In the Segment Routing (SR) processes, the source node 12 converts an Internet Protocol (IP) packet to a Multi-Protocol Label Switching (MPLS) packet for routing the data along the predetermined primary path. When the packet is received at the destination node 14, the destination node 14 converts the MPLS packet back to the IP packet. In a sense, the MPLS conversion is a type of overlay to IP.

As described with respect to the example shown in FIG. 1, Segment Routing (SR) can be understood as a variation of the source routing paradigm. The source node 12 may prepend a header to IP packets to add a list of segments. In this example, the first segment includes the combination of nodes and links from node a to node d; the second segment includes the combination of nodes and links from node c to node f; the third segment includes the combination of nodes and links from node f to node k; and the fourth segment includes the combination of nodes and links from node i to node n. The prepended header includes instructions that are executed on the primary path from intermediate node a through intermediate node o along the routing path 10 in the network. The instructions may be forwarding instructions for routing the packets along the primary path of the routing path and/or along the backup protection paths 16, 18, 20, 22, as needed.

In addition to operating on an MPLS network, SR may also be used in an IPv6 network. In the MPLS network, segments are encoded as MPLS labels. The source node 12 steers the packet through the segments with instructions for particular topological directions and/or for service-based directives. Segment routing can be directly applied to the MPLS architecture with no change in the IP protocol.

Segments can be encoded as a stack of labels. Each of the intermediate nodes a-o can be used to "swap" (i.e., replace) or "pop" (i.e., remove) the top label from the stack before passing the instructions on to the next node. Once a segment is completed, the label is popped (removed). The next segment, if any, can then "push" (i.e., apply) another stack of labels as needed for the processing of this segment. As in the case of the overlapping segments (e.g., the first segment includes nodes a through d and the second segment including nodes c through f), at least one node (e.g., nodes c and d) may include two stacks of labels for processing each segment.

Figure 2:
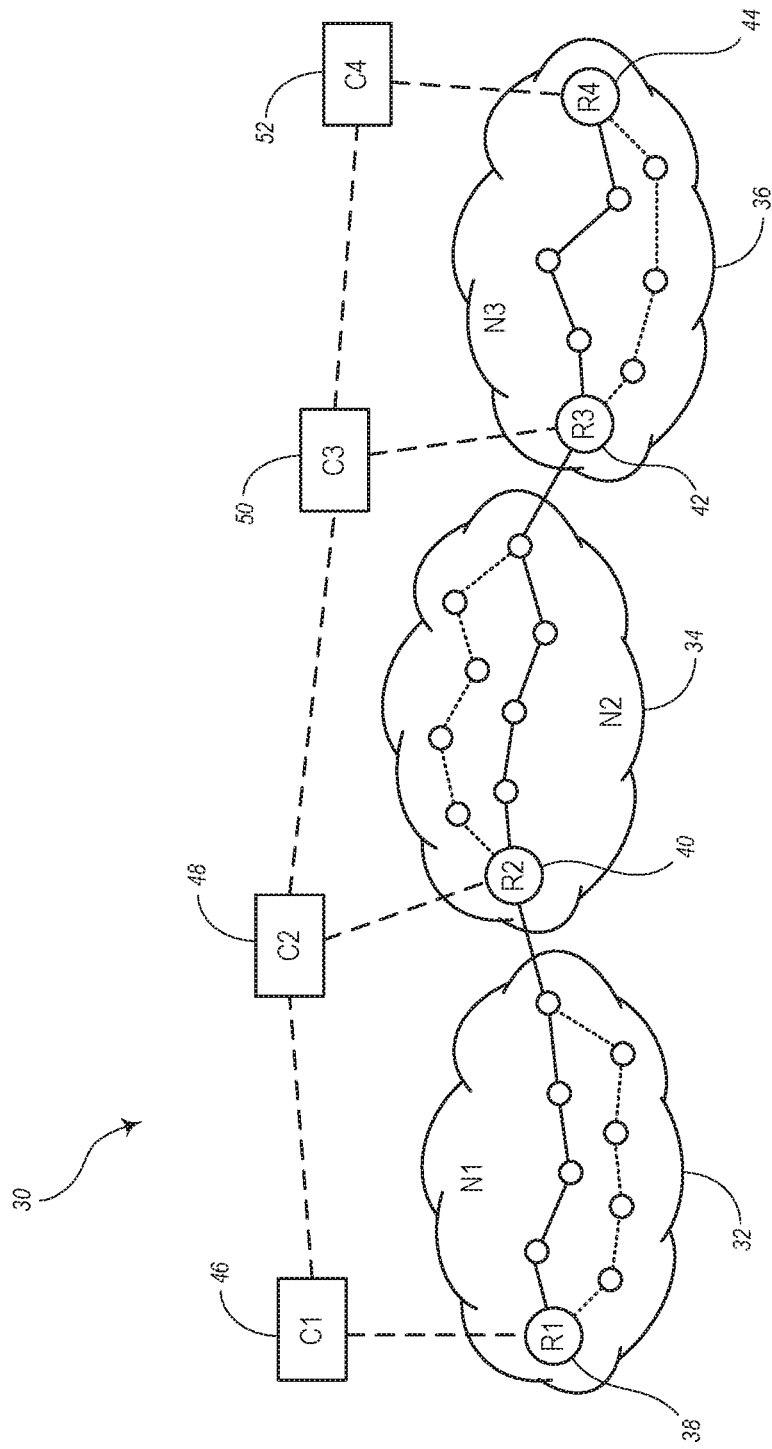
FIG. 2 is a diagram illustrating a telecommunications network having multiple domains where path protection may be controlled by multiple controllers, according to various embodiments of the present disclosure.

FIG. 2 is a schematic diagram showing an embodiment of a telecommunications network 30 having multiple domains, such as domains 32, 34, 36. The domains 32, 34, 36 may represent different types of networks N1, N2, N3 or different areas of a network. For example, domains 32 and 36 may be access networks N1 and N3, such as Internet Protocol (IP) networks. Also, domain 34 may be an aggregate network N2. According to one embodiment, a data routing path may be determined for routing data traffic from a first router (R1) 38, through intermediate routers (R2, R3) 40, 42, to a destination router (R4) 44. An end-to-end Label Switched Path (LSP) may be established for routing data along the desired path (indicated with solid lines) via multiple nodes or routers between each of the routers (R1, R2, R3, F4) 38, 40, 42, 44. Path protection (indicated with dashed lines) may be established from a source router at a front edge of each domain 32, 34, 36 to an end router at a back edge of each domain 32, 34, 36. Also, TI-LFA protection, as calculated by the Interior Gateway Protocol (IGP), can be available at any link along the LSP.

The path protection routes may be controlled by multiple controllers (C1, C2, C3, C4) 46, 48, 50, 52. The controllers 46, 48, 50, 52 communicate with each other and with at least headend routers 38, 40, 42 of the respective domains 32, 34, 36 via the Path Computation Element Protocol (PCEP) within the control plane. The routers 38, 40, 42 may act as Path Computation Clients (PCCs). As described in the present disclosure, the controllers 46, 48, 50, 52 are configured to instruct the headend routers 38, 40, 42 to follow a specific protection policy. For example, the protection policy may include a combination of various protection processes (e.g., TI-LFA, a backup sub-LSP path, etc.) to define end-to-end protection along the LSP.

Segment Routing (SR) provides alternate data traffic paths, referred to as path protection, for steering the data traffic away from failed nodes or failed links interconnecting adjacent nodes. The source router prepends header information for instructing intermediate routers where to route traffic. Existing IP Fast Re-Route (FRR) technology, in combination with the explicit routing capabilities in Segment Routing (SR) guarantees full protection coverage with optimum backup paths. Path protection does not impose any additional signaling requirements.

Each of the headend routers (R1, R2, R3) 38, 40, 42 in the SR network 30 is capable of selecting any path to forward traffic through the respective domains 32, 34, 36 or follow the path provided by the controllers 46, 48, 50, 52. For example, the path may be based on an IGP shortest path policy.

Although only one alternate route (dashed lines) is depicted in each domain 32, 34, 36 shown in FIG. 2, it should be recognized that each primary path may include multiple segments making up the entire primary path, as discussed above with respect to FIG. 1. Thus, segments represent sub-paths that a router can combine to form a complete route to a destination. The alternate paths or protection paths may allow the data traffic to be steered away from any one or more defective segments or links. In some embodiments, the protection paths may be overlapping to provide multiple ways to get around a faulty node or link. Also, one or more of the protection paths may include computed alternate routes determined by intra-domain TI-LFA and/or may include different types of alternate path protection calculations.

Each segment (e.g., the four segments described with respect to FIG. 1) has an identifier (i.e., Segment Identifier (SID)). The SID is distributed throughout the network using new Interior Gate Protocol (IGP) extensions, which may be used in the control plane including controllers 46, 48, 50, 52 or may also be used in an IPv6 control plane. Also, each router (node) and each link (adjacency) may have an associated SID. SIDs may represent the shortest path to a destination router as determined by the IGP. SIDs may be allocated and controlled by each node and then distributed via IGP. Alternatively using the controllers 46, 48, 50, 52, a network administrator may be able to allocate node IDs to each router and adjacency segment IDs to links. The IGP may determine a prefix SID that contains an IP address prefix that is globally unique.

A Traffic Engineering (TE) process may include stitching a number of SIDs together as an ordered list. A segment list can contain several adjacency segments, several node segments, or a combination of both depending on the forwarding requirements.

A label-switched path (LSP) is a unidirectional path through the MPLS network. For example, as discussed with respect to FIG. 1, the primary path (e.g., node a through node o) of the routing path 10 can represent the LSP. The LSP can include a path through one domain or area of a network or can extend through multiple domains or areas.

The LSP begins at an ingress provider edge (PE) switch (e.g., source router 12), which decides which label to prefix to a packet based on the appropriate forwarding equivalence class (FEC). FECs are a set of packets having similar routing or forwarding characteristics.

The source node 12 or PE switch forwards the packet along to the next provider switch (e.g., intermediate nodes a through o) in the path, which swaps or pops the packet outer label for another label and forwards it to the next node. The action of popping or swapping is based on the node's position within the LSP. The penultimate node (e.g., intermediate node o) and the egress provider edge router (e.g., destination node 14) are configured to pop (remove) the label from the packet and forwards the packet based on the header of its next layer. In some cases, the LSP may be referred to as an MPLS tunnel.

Regarding Segment Routing (SR) LSP in MPLS networks, source packet routing or segment routing is contained in the control-plane architecture including the controllers 46, 48, 50, 52. The controllers 46, 48, 50, 52 enable each of the ingress routers (e.g., routers 38, 40, 42) to steer a packet through a specific set of nodes and links in the network without relying on the intermediate nodes in the network to determine the actual path that may be used. Thus, the ingress routers 38, 40, 42 are able to dictate the specific paths through the respective domains 32, 34, 36.

Although SR can be used within a single domain, as described in FIG. 1, it would be beneficial to a network administrator to find a SR solution for defining an LSP "protection policy" for protecting the data traffic of the LSP through multiple domains (e.g., domains 32, 34, 36). The systems and methods described in the present disclosure are configured to remove any ambiguity with respect to an LSP protection policy for multi-domain protected LSPs. In one embodiment, a new flag may be introduced for allowing a network controller system to select one of a plurality of possible protection modes. Using a combination of existing flags and the newly introduced flag, the network administrator can specify a specific LSP protection mode, as desired, for controlling the protection paths along the entire data traffic path through multiple networks, domains, or areas within a network. Protected paths may include TI-LFA calculated paths and/or other protection paths.

Currently, optical networks and packet networks may be used for transmitting data. Products for operation in optical and packet networks can be developed to include the "end-to-end" protection path processes described in the present disclosure. The products can be deployed to build multi-domain SR networks (e.g., packet and packet; packet and optical, etc.). Different types of domains have different mechanisms to control the resources in their domain and establish paths adhering to certain constraints. The LSP protection policy defines the alternate path which ensures that the traffic gets the desired and same treatment across multiple domains. On the other hand, without the end-to-end visibility described in the present disclosure, other networks (including conventional networks) may apply a policy that be inefficient and can lead to wastage of resources.

The systems and methods of the present disclosure define an end-to-end protection policy which helps in supporting all the possible LSP protection modes described below. By defining a uniform protection policy, the present systems ensure that an operator (e.g., utilizing controllers 46, 48, 50, 52 to establish a multi-domain LSP) gets the desired behavior and complete visibility for the LSP protection across all the domains 32, 34, 36. The present systems remove any ambiguity in the conventional approaches for achieving end-to-end LSP protection, ensuring proper allocation and utilization of resources.

Figure 3:
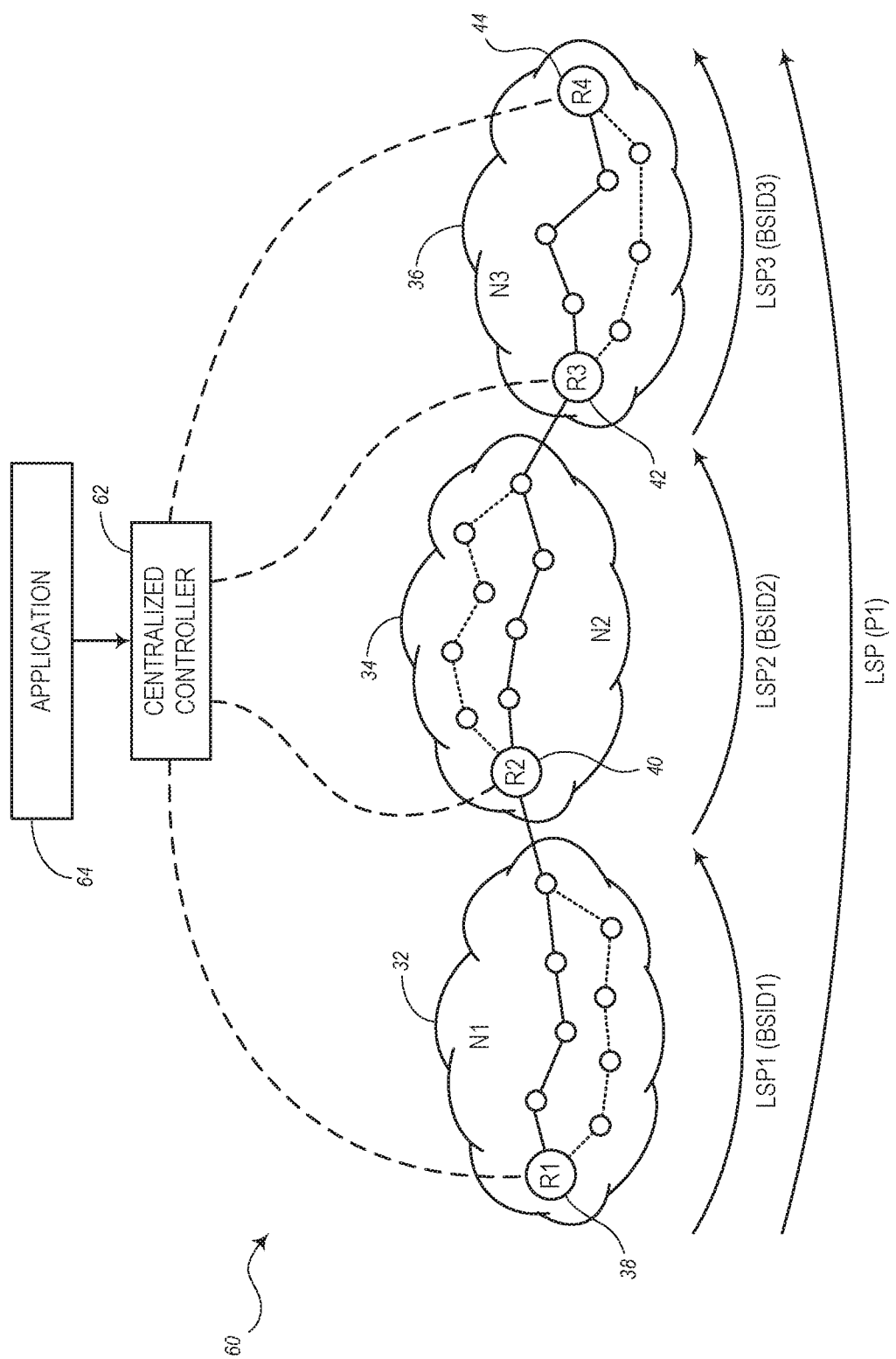
FIG. 3 is a diagram illustrating a telecommunications network having multiple domains where path protection may be controlled by a single controller, according to various embodiments of the present disclosure.

FIG. 3 is a diagram showing an embodiment of a telecommunications network 60 having the multiple domains 32, 34, 36 as described above. However, in the embodiment of FIG. 3, the telecommunications network 60 includes a protected path that can be controlled by a centralized controller 62. In some embodiments, the centralized controller 62 may receive instructions for developing the path protection policy from an application 64. The centralized controller 62 may also develop the path protection policy based on Service Level Agreement (SLA) information or other customer-based contracts, policies, or agreements.

Dynamic Segment Routing (SR) Label Switched Path (LSP) refers to the creation of an SR LSP by the external centralized controller 62 in the control plane of the telecommunications network 60. The SR LSP may be downloaded from the centralized controller 62 to an ingress device (e.g., headend routers 38, 40, 42). The control instructions may be communicated through Path Computation Element Protocol (PCEP) extensions or from a Border Gateway Protocol (BGP) segment routing policy through BGP segment routing extensions. The SR LSP may be dynamically provisioned. The segment list of the dynamic SR LSP may be contained in the PCEP Explicit Route Object (ERO) or in the BGP segment routing policy of the LSP.

According to the embodiment of FIG. 3, which depicts a controller-driven SR network, a "policy" for any path is driven by the centralized controller 62, which may be influenced by a request of an application running on the network (e.g., from the application 64). The policy for the path includes both a "traffic policy" and a "protection policy." The traffic policy of the path (e.g., LSP) defines the characteristics of the traffic. These traffic characteristics define the resources desired from the underlying infrastructure in order to meet the SLA or other requirements or requests by the application 64. For example, the traffic policy may include the SR policies of the domain described with respect to FIG. 1, except that the policy is extended instead over multiple domains.

In addition, each path is associated with the protection policy, which is defined by the operator depending upon the criticality of the application and the availability of the protection mechanisms. The protection policy may include alternate routes, as described above with respect to FIG. 1, but may further include backup protection paths for providing alternate paths that may be used if needed throughout the entire end-to-end path of the telecommunications network 60. Again, TI-LFA protection paths and/or other protection paths may be calculated and combined to form the end-to-end LSP. If a path exists within a domain, both the internal policies (e.g., FIG. 1) and additional policies for other domains and inter-domain paths are under the direct control of the centralized controller 62. In the case of FIG. 2, where the path spans across multiple domains and each domain is controlled by a different controller (e.g., controllers 46, 48, 50, 52), the controller 46 at the headend requests the other controllers (e.g., controllers 48, 50, 52) in other domains to utilize paths which conform to the policies of the headend controller 46. The PCEP (Path Computation Element Protocol) is used for communication among the controllers 46, 48, 50, 52 in the control plane to request paths across the domains 32, 34, 36.

In order to provide greater scalability, network opacity, and service independence, SR utilizes a Binding Segment Identifier (BSID). It is possible to associate a BSID to a SR Traffic Engineering (TE) path. Such a BSID can be used by an upstream node for steering traffic into the appropriate TE path to enforce SR policies. With BSID used for stitching multiple sub-LSPs across domains and a LSP protection policy deployed independently in each domain, the distributed controller (e.g., centralized controller 62) may provide better control over an end-to-end LSP protection mode. In some embodiments, the centralized controller 62 can learn an IGP topology or a TE topology by being a part of the Interior Gateway Protocol (IGP) or Border Gateway Protocol (BGP) in the Link State.

The centralized controller 62 may be configured as a Path Computation Element (PCE). The centralized controller 62 can establish an end-to-end LSP from the source router (R1) 38 to a destination router (R4) 44 according to a specific traffic policy P1. In this embodiment, the centralized controller 62 has visibility across all the domains 32, 34, 36. The BSIDs may be assigned by the Path Computation Client (PCC) at the domain border routers (e.g., routers R1, R2, etc.), which communicates with the centralized controller 62 or PCE or may be assigned by the PCE.

According to one method of operation, the centralized controller 62 may be configured to request router (R3) 42 in the third network domain 36 to establish a SR sub-LSP (e.g., LSP3) for a portion of the traffic policy P1 from router (R3) 42 to router (R4) 44. Router 42 assigns a BSID3 to the LSP3 and returns the same to the centralized controller 62. Centralized controller 62 requests router (R2) 40 in the second network domain 34 to establish a SR sub-LSP (e.g., LSP2) for a portion of the traffic policy P1 from router (R2) 40 to router (R3) 42. The centralized controller 62 provides BSID3 to router (R2) 40 such that the last SID in the SID list formed by router (R2) should be BSID3. Router (R2) assigns a BSID2 to LSP2 and returns the same to the controller 62. The centralized controller 62 then requests router (R1) 38 in the first network domain 32 to establish a SR sub-LSP (e.g., LSP1) for a portion of the traffic policy P1 from router (R1) 38 to router (R2) 40. The centralized controller 62 provides BSID2 to router (R1) 38 such that the last SID in the SID list formed by router (R1) 38 should be BSID2.

Once this process is completed, an end-to-end LSP is established from R1 to R4. The LSP can be viewed as comprising three sub-LSPs (i.e., LSP1, LSP2, and LSP3), which are stitched together by using the BSIDs (i.e., BSID1, BSID2, and BSID3). Router (R1) 38 can be referred to as the "headend" node. Also, routers (R2, R3) 40, 42 can be referred to as "anchor" nodes and are configured to assign BSIDs.

The above example elaborates LSP establishment across domains controlled by the same controller (e.g., centralized controller 62). However, the domains can also be controlled by different controllers (e.g., controllers 46, 48, 50, 52 shown in FIG. 2). In the embodiment of FIG. 2 where the domains are controlled by different controllers, the controller (C1) 46 at the headend is referred as the "master controller." The controllers communicate with each other using PCEP to establish the LSP.

Path protection can take many forms. For example, path protection within each individual domain 32, 34, 36 can be derived via a Topology Independent-Loop Free Alternate (TI-LFA) strategy. TI-LFA may be computed independently by the Interior Gateway Protocol (IGP) on all the routers in each domain for all the links of each router. In one example, it may be assumed that only Link Protection is supported. In this case, alternate paths are computed only for the links within which a sub-LSP traverses. Only these links are protected via TI-LFA in that domain. The same may also apply to the links on the headend node 38 and the anchor nodes 40, 42.

Each sub-LSP can have a backup protection path for providing path protection for the LSP within the domain. This Backup protection path may be initiated by the headend or anchor nodes. For example, router (R2) 40 may establish a backup LSP protection path from router (R2) 40 to router (R3) 42 in order to provide path protection to the sub-LSP labelled as LSP2 in the second network domain 34. Also, router (R1, R2) 38, 40 may have backup LSPs providing end-to-end path protection between this respective router 38, 40 and the destination router (R4) 44.

Therefore, there may be multiple possibilities of "Protection Modes" in which an end-to-end LSP can be established. Five possible Protection Modes of various combinations of protection modes may include:

1. an end-to-end LSP without any protection;
2. an end-to-end LSP with only TI-LFA protection;
3. an end-to-end LSP with sub-LSP path protection at anchor and headend nodes and TI-LFA at other nodes along the LSP path;
4. an end-to-end LSP with sub-LSP path protection at anchor and headend nodes and no TI-LFA protection along the entire path; and
5. an end-to-end LSP with end-to-end path protection at the headend node and no other protection along the rest of the LSP path.

If both sub-LSP path protection and TI-LFA protection are present at an anchor (or headend) node, a selection can be made to choose one type of protection, which may depend upon the local policy that is preferred. If the centralized controller 62 has control over all the domains 32, 34, 36, the centralized controller 62 can control the local policies to establish the protected LSPs accordingly and stitch them together.

If different domains are controlled by different controllers, as in FIG. 2, and the control is based on a controller hierarchy, there may be a need for a pre-defined procedure in order to control the protection mode of an end-to-end LSP. There can be a case where TI-LFA protection is desired at an anchor node, but the local policy may instead choose path protection instead. Also, the controller (e.g., 46, 62) at the headend might need different levels of protection for different LSPs.

Figure 4:
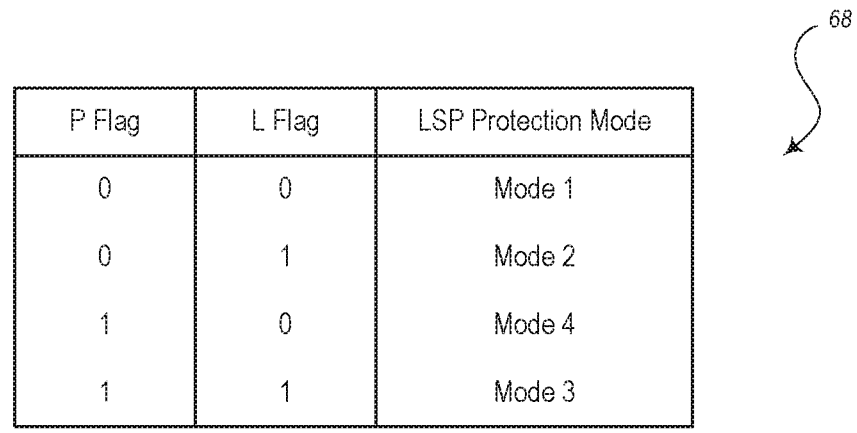
FIG. 4 is a diagram illustrating a table indicating selectable protection modes in an end-to-end LSP, according to various embodiments of the present disclosure.

FIG. 4 is a table 68 showing an embodiment of flags used by the controllers to select an LSP Protection Mode, such as the LSP Protection Modes 1-5 described above. The embodiments of the present disclosure provide a solution to enhance the policy for controlling LSP Protection Mode for inter-domain LSPs. The solution allows to control LSP Protection Modes 2, 3, and 4 defined above. An additional flag "P" may be provided in the flag field of the LSPA object (as defined in RFC 5440) for an LSP request. The combination of the existing flag "L" and the newly added flag "P."

The combination of flags P and L can be used to select a corresponding LSP Protection Mode of the LSP Protection Modes listed above. It should be noted that LSP Protection Mode 5 is not included in the table 68, but may be selected using an additional flag or by other means, since this is a special case of Protection Mode 1.

The Path Computation Element Protocol (PCEP) may be used by the controllers 46, 48, 50, 52, and 62 for communicating with each other and for communicating with the respective nodes 38, 40, 42, 44. In some embodiments, the controllers 46, 48, 50, 52, and 62 may be referred to as Path Computation Engines (PCEs). The PCEP protocol may be the same between the PCEs 46, 48, 50, 52, 62 and the PCC on each border router (e.g., R1, R2, etc.) and between two PCEs 46, 48, 50, 52. For the embodiment of FIG. 3, the solution can be used to control the LSP Protection Mode across the multiple domains.

The LSP Protection Mode 3 may be established according to different strategies depending on which embodiment of FIG. 2 or FIG. 3 is utilized. In other words, one strategy can be used when all the domains 32, 34, 36 are controlled by the same controller (e.g., centralized controller 62 shown in FIG. 3), while another strategy can be used when the domains 32, 34, 36 are controlled by different controllers (e.g., controllers 46, 48, 50, 52 shown in FIG. 2). For this example, an example of establishing an end-to-end LSP protection path from router (R1) 38 to router (R3) 42 spanning across domains 32, 34 may be considered.

Same Controller (FIG. 3)

In this case, the centralized controller 62 is intended to establish an end-to-end LSP from R1 to R3 according to protection policy. The controller 62 controls both the domains 32 and 34. The controller 62 requests that router (R2) 40 in domain 34 establishes a SR sub-LSP (e.g., LSP5) from router R2 to router R3. Also, the controller 62 requests local protection by setting the L flag in the LSPA object. Router R2 establishes the LSP using a protected "adjacency" SID, assigns B SIDS to this sub-LSP, and returns the B SIDS to the controller 62.

Then, the controller 62 requests router R2 in domain 34 to establish a SR sub-LSP (e.g., LSP4) from router R2 to router R3 which is disjoint from LSP5. The controller 62 requests local protection by setting the L flag in the LSPA object. Router R2 establishes the LSP using the protected adjacency SID, assigns BSID4 to this sub-LSP, and returns the BSID4 to the controller 62.

The controller 62 makes LSP4 as a backup LSP for LSP5 by associating these sub-LSPs using Path Protection Association Group. The BSID of the primary LSP is used for stitching by upstream node. Path Protection overrides TI-LFA protection at router R2 (anchor node) due to a local policy.

The controller 62 requests router R1 in domain 32 to establish a SR sub-LSP (e.g., LSP1) from router R1 to router R2. The controller 62 provides B SIDS to router R1 such that the last SID in the SID list formed by router R1 should be BSID5. The controller 62 requests local protection by setting the L flag in the LSPA object. Router R1 establishes the LSP using the protected adjacency SID, assigns a BSID3 to this sub-LSP, and returns the BSID3 to the controller 62.

Next, the controller 62 requests router R1 in domain 32 to establish a SR sub-LSP (e.g., LSP2) from router R1 to router R2 that is disjoint from LSP1. The controller 62 provides BSID5 to router R1 such that the last SID in the SID list formed by router R1 should be BSID5. The controller 62 requests local protection by setting the L flag in the LSPA object. Router R1 establishes the LSP using the protected adjacency SID, assigns BSID2 to this sub-LSP, and returns the BSID2 to the controller 62.

Also, controller 62 makes LSP2 as a backup LSP for LSP1 by associating these LSPs using Path Protection Association Group. The BSID of primary LSP is used for stitching by upstream node. Path Protection overrides TI-LFA protection at R1 due to a local policy.

Different Controllers (FIG. 2)

The controllers 46, 48, 50, 52 can learn the IGP and TE topologies by any means. Headend controller 46 can learn the IGP and TE topologies by being a part of IGP or BGP-LS. Controller 46 controls domain 32 and controller 48 controls domain 34. As mentioned above, the domains 32 and 36 may be access networks and the domain 34 may be an aggregate network. The controllers 46, 48, 50, 52 talk to each other for establishing end-end cross domain LSPs. The headend controller 46 wants to establish an end-to-end LSP from R1 to R3 according to a protection policy. If the controller 46 follows the same procedure as that for the embodiment of FIG. 3, it may be difficult to establish Path Protection in individual domains and stitch the LSPs end-to-end. The local protection policy at controller 46 can be different than the protection policy at controller 48.

Rather, the controllers may execute the following procedures:

1. Controller 46 requests controller 48 to establish a SR sub-LSP from R2 to R3. Controller 46 requests LSP protection mode 3 by setting the L and P flags in the LSPA object.

2. Controller 48 requests router R2 in domain 34 to establish a SR sub-LSP (e.g., LSP3) from router R2 to router R3. Controller 48 requests local protection by setting the L flag in the LSPA object. Router R2 establishes the LSP using the protected adjacency SIDs, assigns a BSID1 to this sub-LSP, and returns BSID1 to controller 48.

3. Controller 48 requests router R2 in domain 34 to establish a SR sub-LSP (e.g., LSP4) from router R2 to router R3 which is disjoint from LSP3. Controller 48 requests local protection by setting the L flag in the LSPA object. Router R2 establishes the LSP using the protected adjacency SIDs, assigns a BSID2 to this sub-LSP, and returns BSID2 to controller 48.

4. Controller 48 makes LSP4 as a Backup LSP for LSP3 by associating these LSPs using Path Protection Association Group. The BSID of Primary LSP is used for stitching by upstream nodes. Path Protection overrides TI-LFA protection at R2, as requested by controller 48. The Policy is local to controller 46 but not to controller 48.

5. Controller 48 returns BSID1 to controller 46 for the established protected LSP.

6. Controller 46 requests router R1 in domain 32 to establish a SR sub-LSP (e.g., LSP1) from router R1 to router R2. Controller 46 provides BSID1 to router R1 such that the last SID in the SID list formed by router R1 would be BSID1. Controller 46 requests local protection by setting the L flag in the LSPA object. Router R1 establishes the LSP using the protected adjacency SIDs, assigns a BSID3 to this sub-LSP, and returns BSID3 to controller 46.

7. Controller 46 requests router R1 in domain 32 to establish a SR sub-LSP (e.g., LSP2) from router R1 to router R2 which is disjoint from LSP1. Controller 46 provides BSID1 to router R1 such that the last SID in the SID list formed by router R1 would be BSID1. Controller 46 requests local protection by setting the L flag in the LSPA object. Router R1 establishes the LSP using the protected adjacency SIDs, assigns BSID4 to this sub-LSP, and returns BSID4 to the controller 46.

8. Controller 46 makes LSP2 as a Backup LSP for LSP1 by associating these LSPs using Path Protection Association Group. The BSID of Primary LSP is used for stitching by upstream nodes. Path Protection overrides TI-LFA protection at router R1 as per the local policy.

Figure 5:
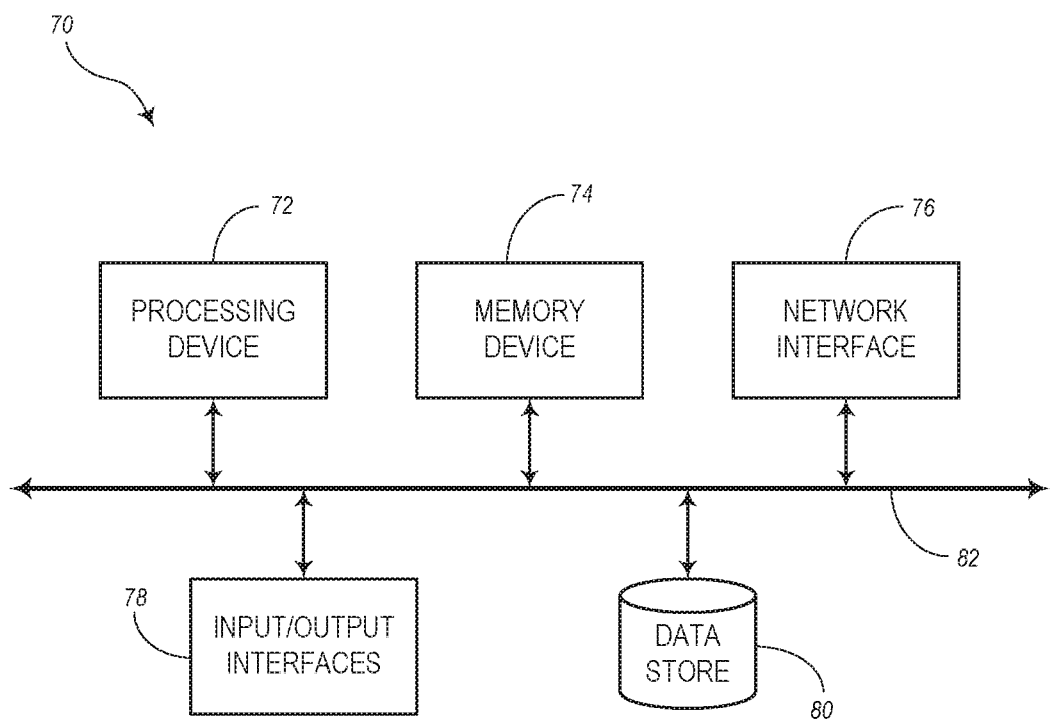
FIG. 5 is a block diagram illustrating at least one of the controllers shown in FIGS. 2 and 3, according to various embodiments of the present disclosure.

FIG. 5 is a block diagram of an embodiment of a controller 70, where the controller 70 may be at least one of the controllers 46, 48, 50, 52, 62 shown in FIGS. 2 and 3. In this embodiment, the controller 70 includes a processing device 72, a memory device 74, a network interface 76, input/output (I/O) interfaces 78, and a data store 80. The components 72, 74, 76, 78, and 80 are interconnected with each other via a bus interface 82.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor or processing device may be a microprocessor, but in the alternative, the processing device may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To clearly illustrate this interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

According to one embodiment, a non-transitory computer-readable medium may be configured for storing software logic executable by one or more processing devices, such as the processing device 72. The software logic may be configured to enable the one or more processing devices to perform various functions to provide end-to-end LSP protection by selecting a Path Protection Mode in an SR network. For example, by executing the software logic, the processing device 72 may be configured to create a traffic policy that defines a Label Switched Path (LSP) configured to route data traffic in a unitary direction in a data plane of a telecommunications network. The LSP is configured to route the data traffic from a source router of an initial network domain to a destination router of a final network domain. The processing device 72 further executes the software logic to create a protection policy that defines one or more backup protection paths for routing the data traffic around one or more faulty nodes, links, or segments in a Segment Routing (SR) architecture of the telecommunications network. Also, the software logic enables the processing device 72 to communicate the traffic policy and protection policy to a plurality of routers in the telecommunication network via the Path Computation Element Protocol (PCEP), the plurality of routers including at least the source router and destination router.

According to further embodiments, the non-transitory computer-readable medium described above may further be configured such that the telecommunications network includes one or more intermediate network domains between the initial network domain and the final network domain. For example, the initial network domain may be an access network, the final network domain may be an access network, and the one or more intermediate network domains may include one or more aggregate networks. The one or more processing devices may be configured to create the traffic policy in order to meet a predetermined Service Level Agreement (SLA).

The software logic of the non-transitory computer-readable medium may further enable the one or more processing devices to assign a Binding Segment Identifier (BSID) to each of the one or more backup protection paths. The BSIDs enable the one or more backup protection paths to steer the data traffic into one or more predetermined Traffic Engineering (TE) paths to enforce SR policies. For example, the LSP may include a plurality of sub-LSPs, where each sub-LSP is configured to route the data traffic through a respective network domain, the sub-LSPs being stitched together using the BSIDs to form an end-to-end path of the LSP. The one or more backup protection paths may include one or more sub-LSP protection paths. The one or more backup protection paths may include one or more intra-domain Topology Independent-Loop Free Alternate (TI-LFA) paths. The one or more backup protection paths may include one or more sub-LSP protection paths and one or more intra-domain Topology Independent-Loop Free Alternate (TI-LFA) paths. The protection policy may include using none of the one or more backup protection paths.

The software logic enables the one or more processing devices to utilize an additional flag for selecting an option from multiple possibilities for implementing the protection policy, the additional flag being part of the Label Switched Path Association (LSPA) object defined in the RFC 5440 protocol. The one or more processing devices may be incorporated in one or more controllers operating in a control plane of the telecommunications network. The one or more controllers may include one or more Software-Defined Networking (SDN) controllers and/or one or more Path Computation Element (PCE) controllers. The one or more controllers may utilize Interior Gateway Protocol (IGP) and/or Border Gateway Protocol (BGP).

The controller 70 is configured for controlling the routing of data traffic through the domains 32, 34, 36 or areas of the telecommunications networks 30, 60 of FIGS. 2 and 3. In the illustrated embodiment, the controller 70 may be a digital computer that, in terms of hardware architecture, generally includes the processing device 72, the memory device 74, the I/O interfaces 76, the network interface 78, and the data store 80. In some embodiments, the data store 80 may be part of the memory device 74, which may include one or more data stores, databases, or the like. It should be appreciated by those of ordinary skill in the art that FIG. 3 depicts the controller 70 in a simplified manner, where practical embodiments may include additional components and suitably configured processing logic to support known or conventional operating features that are not described in detail herein. The components (i.e., 72, 74, 76, 78, 80) are communicatively coupled via the bus interface 82. The bus interface 82 may be, for example, but not limited to, one or more buses or other wired or wireless connections. The bus interface 82 may have additional elements, which are omitted for simplicity, such as controllers, buffers, caches, drivers, repeaters, receivers, among other elements, to enable communications. Further, the bus interface 82 may include address, control, and/or data connections to enable appropriate communications among the components 72, 74, 76, 78, 80.

The processing device 72 is a hardware device adapted for at least executing software instructions. The processing device 72 may be any custom made or commercially available processor, a central processing unit (CPU), an auxiliary processor among several processors associated with the controller 70, a semiconductor-based microprocessor (in the form of a microchip or chip set), or generally any device for executing software instructions. When the controller 70 is in operation, the processing device 72 may be configured to execute software stored within the memory device 74, to communicate data to and from the memory device 74, and to generally control operations of the controller 70 pursuant to the software instructions.

It will be appreciated that some embodiments of the processing device 72 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 72 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O interfaces 76 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 76 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 78 may be used to enable the controller 70 to communicate over a network, such as the telecommunications network 30, 60, the Internet, a wide area network (WAN), a local area network (LAN), and the like. The network interface 78 may include, for example, an Ethernet card or adapter (e.g., 10BaseT, Fast Ethernet, Gigabit Ethernet, 10 GbE) or a wireless local area network (WLAN) card or adapter (e.g., 802.11 a/b/g/n/ac). The network interface 78 may include address, control, and/or data connections to enable appropriate communications on the telecommunications network 30, 60.

The memory device 74 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 74 may incorporate electronic, magnetic, optical, and/or other types of storage media. The memory device 74 may have a distributed architecture, where various components are situated remotely from one another, but can be accessed by the processing device 72. The software in memory device 74 may include one or more software programs, each of which may include an ordered listing of executable instructions for implementing logical functions. The software in the memory device 74 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 74 may include the data store 80 used to store data. In one example, the data store 80 may be located internal to the controller 70 and may include, for example, an internal hard drive connected to the bus interface 82 in the controller 70. Additionally, in another embodiment, the data store 80 may be located external to the controller 70 and may include, for example, an external hard drive connected to the I/O interfaces 76 (e.g., SCSI or USB connection). In a further embodiment, the data store 80 may be connected to the controller 70 through a network and may include, for example, a network attached file server.

Moreover, some embodiments may include a non-transitory computer-readable storage medium having computer readable code stored in the memory device 74 for programming the controller 70 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 72 that, in response to such execution, cause the processing device 72 to perform a set of operations, steps, methods, processes, algorithms, functions, techniques, etc. as described herein for the various embodiments.

Figure 6:
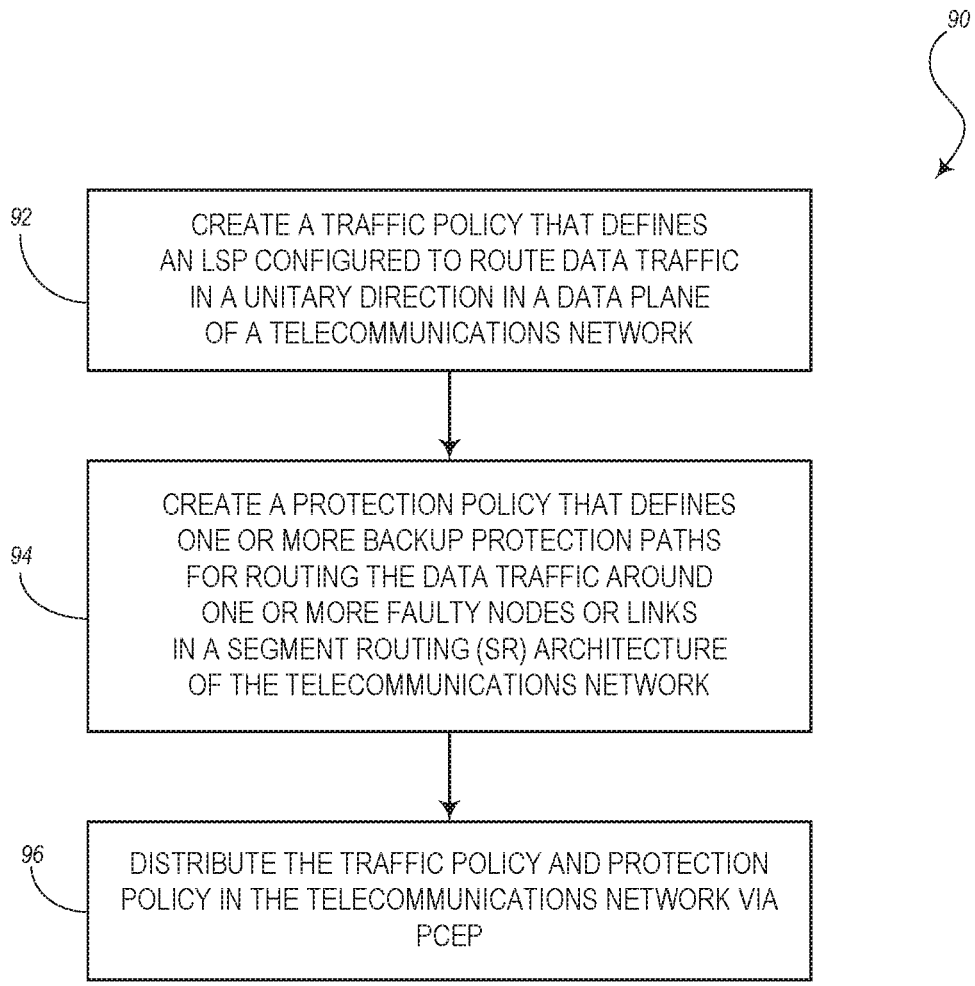
FIG. 6 is a flow diagram illustrating a method of managing routers in a Segment Routing (SR) telecommunications network for selecting a protection mode, according to various embodiments of the present disclosure.

FIG. 6 is a flow diagram of an embodiment of a method 90 for establishing a path protection policy for an LSP extending over multiple network domains or extending over multiple areas within a network. The method 90 includes a step of creating a traffic policy that defines an LSP configured to route data traffic in a unitary direction in a data plane of a telecommunications network, as indicated in block 92. For example, the LSP may be configured to route the data traffic from a source router of an initial network domain to a destination router of a final network domain. The method 90 further includes the step of creating a protection policy that defines one or more backup protection paths for routing the data traffic around one or more faulty nodes, links, or segments in a Segment Routing (SR) architecture of the telecommunications network, as indicated in block 94. Also, the method 90 includes the step of distributing the traffic policy and protection policy in the telecommunication network via the Path Computation Element Protocol (PCEP), as indicated in block 96. The plurality of routers includes at least the source router and destination router.

According to additional embodiments, methods for establishing path protection policies may further include creating the traffic policy in order to meet a predetermined Service Level Agreement (SLA). The methods may also include assigning a Binding Segment Identifier (BSID) to each of the one or more backup protection paths. The BSIDs enable the one or more backup protection paths to steer the data traffic into one or more predetermined Traffic Engineering (TE) paths to enforce SR policies.

The LSP includes a plurality of sub-LSPs, each sub-LSP configured to route the data traffic through a respective network domain, the sub-LSPs being stitched together using the BSIDs to form an end-to-end path of the LSP. The one or more backup protection paths may include: (a) one or more sub-LSP protection paths; (b) one or more intra-domain Topology Independent-Loop Free Alternate (TI-LFA) paths; or (c) one or more sub-LSP protection paths and one or more intra-domain Topology Independent-Loop Free Alternate (TI-LFA) paths. The methods may also include utilizing an additional flag (e.g., the P flag mentioned above) for selecting an option from multiple possibilities for implementing the protection policy. The additional flag may be part of a Label Switched Path Association (LSPA) object defined in the RFC 5440 protocol.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium configured for storing software logic executable by one or more processing devices, the software logic enabling the one or more processing devices to:
   create a traffic policy that defines a Label Switched Path (LSP) configured to route data traffic in a unitary direction in a data plane of a telecommunications network, the LSP configured to route the data traffic from a source router of an initial network domain to a destination router of a final network domain, wherein the initial network domain and the final network domain are controlled by different controllers;
   create a protection policy that defines one or more backup protection paths for routing the data traffic around one or more faulty nodes or links in a Segment Routing (SR) architecture of the telecommunications network; and
   distribute the traffic policy and protection policy in the telecommunications network via the Path Computation Element Protocol (PCEP), wherein the protection policy is described in an additional flag in a Label Switched Path Association (LSPA) object that is communicated between the different controllers.

2. The non-transitory computer-readable medium of claim 1, wherein the software logic enables the one or more processing devices to distribute the traffic policy and protection policy directly to one or more routers in the telecommunications network, the one or more routers including at least the source router.

3. The non-transitory computer-readable medium of claim 1, wherein the software logic enables the one or more processing devices to distribute the traffic policy and protection policy to one or more controllers associated with one or more domains to allow each of the one or more controllers to distribute the traffic policy and protection policy to a router in the respective domain.

4. The non-transitory computer-readable medium of claim 1, wherein the software logic enables the one or more processing devices to create the traffic policy in order to meet a predetermined Service Level Agreement (SLA).

5. The non-transitory computer-readable medium of claim 1, wherein the software logic enables the one or more processing devices to receive a Binding Segment Identifier (BSID) from each of one or more routers, each BSID being assigned by a respective router to each of the one or more backup protection paths.

6. The non-transitory computer-readable medium of claim 5, wherein the BSIDs enable the one or more backup protection paths to steer the data traffic into one or more predetermined Traffic Engineering (TE) paths to enforce SR policies.

7. The non-transitory computer-readable medium of claim 5, wherein the LSP includes a plurality of sub-LSPs, each sub-LSP configured to route the data traffic through a respective network domain, the sub-LSPs being stitched together using the BSIDs to form an end-to-end path of the LSP.

8. The non-transitory computer-readable medium of claim 7, wherein the one or more backup protection paths include one or more of the following paths
   an LSP with no protection,
   one or more sub-LSP protection paths,
   one or more intra-domain Topology Independent-Loop Free Alternate (TI-LFA) paths,
   one or more sub-LSP protection paths and one or more intra-domain TI-LFA paths, or
   a protection path using backup LSP from source to destination.

9. The non-transitory computer-readable medium of claim 7, wherein the protection policy includes using none of the one or more protection paths.

10. The non-transitory computer-readable medium of claim 7, wherein the software logic enables the one or more processing devices to utilize the additional flag for selecting an option from multiple possibilities for implementing the protection policy, the additional flag being part of the Label Switched Path Association (LSPA) object defined in the RFC 5440 protocol.

11. The non-transitory computer-readable medium of claim 1, wherein the one or more processing devices are incorporated in one or more controllers operating in a control plane of the telecommunications network, the one or more controllers including one or more of Software-Defined Networking (SDN) controllers and Path Computation Element (PCE) controllers.

12. The non-transitory computer-readable medium of claim 11, wherein the one or more controllers utilize one or more of Interior Gateway Protocol (IGP), Border Gateway Protocol (BGP), and BGP Link-State (BGP-LS).

13. The non-transitory computer-readable medium of claim 1, wherein the telecommunications network includes one or more intermediate network domains between the initial network domain and the final network domain.

14. The non-transitory computer-readable medium of claim 13, wherein the initial network domain is an access network, the final network domain is an access network, and the one or more intermediate network domains include one or more aggregate networks.

15. A controller comprising:
   a processing device; and
   a memory device configured to store instructions that, when executed, cause the processing device to
      create a traffic policy that defines a Label Switched Path (LSP) configured to route data traffic in a unitary direction in a data plane of a telecommunications network including a plurality of network domains, the LSP configured to route the data traffic from a source router of an initial network domain to a destination router of a final network domain, wherein the initial network domain and the final network domain are controlled by different controllers,
      create a protection policy that defines one or more backup protection paths for routing the data traffic around one or more faulty nodes or links in a Segment Routing (SR) architecture of the telecommunications network, and
      distribute the traffic policy and protection policy in the telecommunications network via the Path Computation Element Protocol (PCEP), wherein the protection policy is described in an additional flag in a Label Switched Path Association (LSPA) object that is communicated between the different controllers.

16. The controller of claim 15, wherein the instructions further cause the processing device to receive a Binding Segment Identifier (BSID) from each of one or more routers, each BSID being assigned by a respective router to each of the one or more backup protection paths, wherein the BSIDs enable the one or more backup protection paths to steer the data traffic into one or more predetermined Traffic Engineering (TE) paths to enforce SR policies.

17. The controller of claim 16, wherein the one or more backup protection paths include one of the following paths:
   LSP with no protection,
   one or more sub-LSP protection paths,
   one or more intra-domain Topology Independent-Loop Free Alternate (TI-LFA) paths,
   one or more sub-LSP protection paths and one or more intra-domain Topology Independent-Loop Free Alternate (TI-LFA) paths, or
   protection path using backup LSP from source to destination.

18. The controller of claim 15, wherein the LSP includes a plurality of sub-LSPs, each sub-LSP configured to route the data traffic through a respective network domain, the sub-LSPs being stitched together using Binding Segment Identifiers (BSIDs) to form an end-to-end path of the LSP.

19. The controller of claim 15, wherein the controller is a centralized controller and the instructions are further configured to cause the processing device to distribute the traffic policy and protection policy to at least one router in each respective network domain.

20. A method comprising the steps of:
   creating a traffic policy that defines a Label Switched Path (LSP) configured to route data traffic in a unitary direction in a data plane of a telecommunications network, the LSP configured to route the data traffic from a source router of an initial network domain to a destination router of a final network domain, wherein the initial network domain and the final network domain are controlled by different controllers;

creating a protection policy that defines one or more backup protection paths for routing the data traffic around one or more faulty nodes or links in a Segment Routing (SR) architecture of the telecommunications network; and distributing the traffic policy and protection policy in the telecommunications network via the Path Computation Element Protocol (PCEP), wherein the protection policy is described in an additional flag in a Label Switched Path Association (LSPA) object that is communicated between the different controllers.

\* \* \* \* \*